(12) United States Patent
Murakami et al.

(10) Patent No.: US 10,797,626 B2
(45) Date of Patent: Oct. 6, 2020

(54) MOTOR DRIVE CONTROL DEVICE AND CONTROL METHOD FOR MOTOR DRIVE CONTROL DEVICE

(71) Applicant: MINEBEA MITSUMI Inc., Nagano (JP)

(72) Inventors: Hiroaki Murakami, Hamamatsu (JP); Toshihiro Tamitsuji, Iwata (JP); Yuuya Hisatomi, Hamamatsu (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 16/449,827

(22) Filed: Jun. 24, 2019

(65) Prior Publication Data

US 2020/0014314 A1    Jan. 9, 2020

(30) Foreign Application Priority Data

Jul. 3, 2018    (JP) .................. 2018-127013

(51) Int. Cl.
| | |
|---|---|
| *H02P 1/42* | (2006.01) |
| *H02P 3/18* | (2006.01) |
| *H02P 23/00* | (2016.01) |
| *H02P 25/00* | (2006.01) |
| *H02P 6/24* | (2006.01) |
| *H02P 6/30* | (2016.01) |
| *H02K 15/00* | (2006.01) |
| *H02K 11/26* | (2016.01) |

(52) U.S. Cl.
CPC ............. *H02P 6/24* (2013.01); *H02K 11/26* (2016.01); *H02K 15/0006* (2013.01); *H02P 6/30* (2016.02)

(58) Field of Classification Search
CPC .................................. H02P 6/26; H02K 11/26
USPC ............................................ 318/774
See application file for complete search history.

(56) References Cited

U.S. PATENT DOCUMENTS

| | | | | |
|---|---|---|---|---|
| 5,146,147 A | * | 9/1992 | Wills .................. | H02P 1/44 318/797 |
| 2011/0266989 A1 | * | 11/2011 | Horng ................. | H02K 3/28 318/400.26 |
| 2013/0307460 A1 | * | 11/2013 | Tsuchihashi ........... | H02P 8/34 318/696 |

(Continued)

FOREIGN PATENT DOCUMENTS

JP    2009-077543 A    4/2009

*Primary Examiner* — Erick D Glass
(74) *Attorney, Agent, or Firm* — Pearne & Gordon LLP (57) ABSTRACT

A motor drive control device causes a single phase motor including a coil of a first system and a coil of a second system to be driven. The motor drive control device has a first driving circuit configured to perform control to energize the coil of the first system, a second driving circuit configured to perform control to energize the coil of the second system, and a driving control unit configured to control an operation of the first driving circuit and an operation of the second driving circuit. The driving control unit has a driving voltage detecting unit configured to detect a driving voltage applied to the first driving circuit and a driving voltage applied to the second driving circuit, and a compensation control unit configured to cause one driving circuit between the first driving circuit and the second driving circuit to execute a maintenance operation for maintaining rotation of the single phase motor, based on a detection result of the driving voltage detecting unit.

11 Claims, 6 Drawing Sheets

(56) References Cited

U.S. PATENT DOCUMENTS

| | | | | |
|---|---|---|---|---|
| 2013/0307463 A1* | 11/2013 | Otsuka | ............... | H02M 5/297 318/800 |
| 2015/0214874 A1* | 7/2015 | Wang | ............... | H02P 6/08 318/400.26 |
| 2015/0333689 A1* | 11/2015 | Kudoh | ............... | H02M 5/297 318/800 |
| 2019/0326843 A1* | 10/2019 | Kawai | ............... | H02P 27/06 |

\* cited by examiner

| OPERATION MODE | DRIVING VOLTAGE CONFIRMATION V1&V2 | DRIVING VOLTAGE COMPARISON V1vsV2 | ACTUAL NUMBER OF ROTATIONS CONFIRMATION | DRIVING CIRCUIT CONTROL 10 | DRIVING CIRCUIT CONTROL 10b | FG OUTPUT |
|---|---|---|---|---|---|---|
| 1 | AT LEAST ONE IS EQUAL TO OR ABOVE 10 V | VOLTAGE DIFFERENCE IS BELOW 1 V | EQUAL TO OR ABOVE 1600 rpm | STEADY | STEADY | FG |
| 2 | AT LEAST ONE IS EQUAL TO OR ABOVE 10 V | V1 IS HIGHER BY 1 V OR MORE | EQUAL TO OR ABOVE 1600 rpm | MAX | STOP | High |
| 3 | AT LEAST ONE IS EQUAL TO OR ABOVE 10 V | V2 IS HIGHER BY 1 V OR MORE | EQUAL TO OR ABOVE 1600 rpm | STOP | MAX | High |
| 4 | — | — | BELOW 1600 rpm | STOP | STOP | Low |
| 5 | BOTH ARE BELOW 10 V | — | — | STOP | STOP | Low |

| OPERATION MODE | DRIVING VOLTAGE CONFIRMATION | | ACTUAL NUMBER OF ROTATIONS CONFIRMATION | DRIVING CIRCUIT CONTROL | | FG OUTPUT |
| --- | --- | --- | --- | --- | --- | --- |
| | V1 | V2 | | 10 | 10b | FG |
| 1 | EQUAL TO OR ABOVE 10 V | EQUAL TO OR ABOVE 10 V | EQUAL TO OR ABOVE 1600 rpm | STEADY | STEADY | FG |
| 2 | BELOW 10 V | EQUAL TO OR ABOVE 10 V | EQUAL TO OR ABOVE 1600 rpm | STOP | MAX | High |
| 3 | EQUAL TO OR ABOVE 10 V | BELOW 10 V | EQUAL TO OR ABOVE 1600 rpm | MAX | STOP | High |
| 4 | BELOW 10 V | BELOW 10 V | (BELOW 1600 rpm) | STOP | STOP | (Low) |
| 5 | — | — | BELOW 1600 rpm | STOP | STOP | Low |

MOTOR DRIVE CONTROL DEVICE AND CONTROL METHOD FOR MOTOR DRIVE CONTROL DEVICE

CROSS REFERENCE TO RELATED APPLICATIONS

This application claims the benefit of Japanese Patent Application No. 2018-127013, filed Jul. 3, 2018, which is hereby incorporated by reference in its entirety.

BACKGROUND

Technical Field

The present disclosure relates to a motor drive control device and a control method for the motor drive control device, and in particular to a motor drive control device having driving circuits of two systems and a control method for the motor drive control device.

Background

Conventionally, a motor driving apparatus driving a single phase motor has been disclosed (see, for example, Japanese Patent Laid-Open No. 2009-77543).

SUMMARY

There may be a case where trouble occurs in a driving circuit of a motor drive control device, and it becomes impossible to cause a motor to be driven. For example, when, a motor is caused to be driven in a predetermined rotation direction (a positive direction), the motor drive control device cannot cause the motor to be driven as described above, and the motor is forced to rotate in a direction opposite to the predetermined rotation direction (reversely rotate) by external force acting on the motor, a problem may occur.

For example, in the case of driving a fan motor by a motor drive control device, if a driving circuit of the motor drive control device breaks down because of a fuse of a power source line being blown or the like, driving of the fan motor stops. In such a case, for example, if wind enters the fan motor accompanying an operation of another fan motor used in conjunction with that fan motor, there is a possibility that that fan motor will rotate in reverse. For example, in a case where a plurality of fan motors are used for the purpose of cooling an apparatus surrounded by a housing, when one fan motor reversely rotates as described above, there is a possibility that an internal pressure drop of the apparatus will be caused, a cooling function will deteriorate, and the function of the apparatus will be affected. Therefore, it is necessary to cause positive rotation of a fan motor to be continued as long as possible.

The present disclosure is related to providing a motor drive control device capable of causing positive motor rotation of a motor to continue as long as possible and a control method for the motor drive control device.

In accordance with one aspect of the present disclosure, a motor drive control device is a motor drive control device causing a single phase motor including a coil of a first system and a coil of a second system to be driven, the motor drive control device including: a first driving circuit configured to perform control to energize the coil of the first system; a second driving circuit configured to perform control to energize the coil of the second system; and a driving control unit configured to control an operation of the first driving circuit and an operation of the second driving circuit, wherein the driving control unit includes: a driving voltage detecting unit configured to detect a driving voltage applied to the first driving circuit and a driving voltage applied to the second driving circuit; and a compensation control unit configured to cause one driving circuit between the first driving circuit and the second driving circuit to execute a maintenance operation for maintaining rotation of the single phase motor based on a detection result of the driving voltage detecting unit.

Preferably, when causing one driving circuit between the first driving circuit and the second driving circuit to execute the maintenance operation, the compensation control unit causes the operation of another driving circuit to stop.

Preferably, when a difference between the driving voltage applied to the first driving circuit and the driving voltage applied to the second driving circuit is equal to or above a first predetermined value, the compensation control unit causes a driving circuit the applied driving voltage of which is higher to execute the maintenance operation; and, when the difference is below the first predetermined value, the compensation control unit does not perform control to cause the maintenance operation to be executed.

Preferably, when the driving voltage applied to one driving circuit between the first driving circuit and the second driving circuit is equal to or above a second predetermined value, and the driving voltage applied to another driving circuit is below the second predetermined value, the compensation control unit causes the one driving circuit to execute the maintenance operation.

Preferably, when both the driving voltage applied to the first driving circuit and the driving voltage applied to the second driving circuit are below a third predetermined value, the driving control unit causes the operations of both of the first driving circuit and the second driving circuit to stop.

Preferably, the driving control unit further includes a number-of-rotation detecting units configured to detect the actual number of rotations of the single phase motor; and the compensation control unit causes the maintenance operation to be executed based on a detection result of the driving voltage detecting unit and a detection result of the number-of-rotations detecting unit.

Preferably, when the actual number of rotations of the single phase motor is below a predetermined number of rotations, the driving control unit causes the operations of both of the first driving circuit and the second driving circuit to stop irrespective of the detection result of the driving voltage detecting unit.

Preferably, the driving control unit includes an output terminal configured to output an FG signal corresponding to the actual number of rotations of the single phase motor; and, when the compensation control unit performs the control to cause the maintenance operation to be executed, the driving control unit outputs a predetermined compensation time signal different from the FG signal from the output terminal.

Preferably, the compensation time signal is a signal with a voltage fixed at a high level or a low level.

Preferably, the maintenance operation executed by one driving circuit between the first driving circuit and the second driving circuit is an operation of compensating for driving force applied to the single phase motor by another driving circuit by flowing a current that is the same as or larger than a current in a case where the maintenance operation is not performed, through the first coil or the second coil.

In accordance with another aspect of the present disclosure, a control method for a motor drive control device is a control method for a motor drive control device causing a single phase motor including a coil of a first system and a coil of a second system to be driven, wherein the motor drive control device includes: a first driving circuit configured to perform control to energize the coil of the first system; and a second driving circuit configured to perform control to energize the coil of the second system; and the control method for the motor drive control device includes: a driving voltage detecting step of detecting a driving voltage applied to the first driving circuit and a driving voltage applied to the second driving circuit; and a compensation control step of causing one driving circuit between the first driving circuit and the second driving circuit to execute a maintenance operation for maintaining rotation of the single phase motor, based on a detection result of the driving voltage detecting step.

According to the disclosure, it is possible to provide a motor drive control device capable of causing positive rotation of a motor to continue as far as possible, and a control method for the motor drive control device.

DETAILED DESCRIPTION

Hereinafter, a motor drive control device in an embodiment of the present disclosure will be described.

Embodiment

Figure 1:
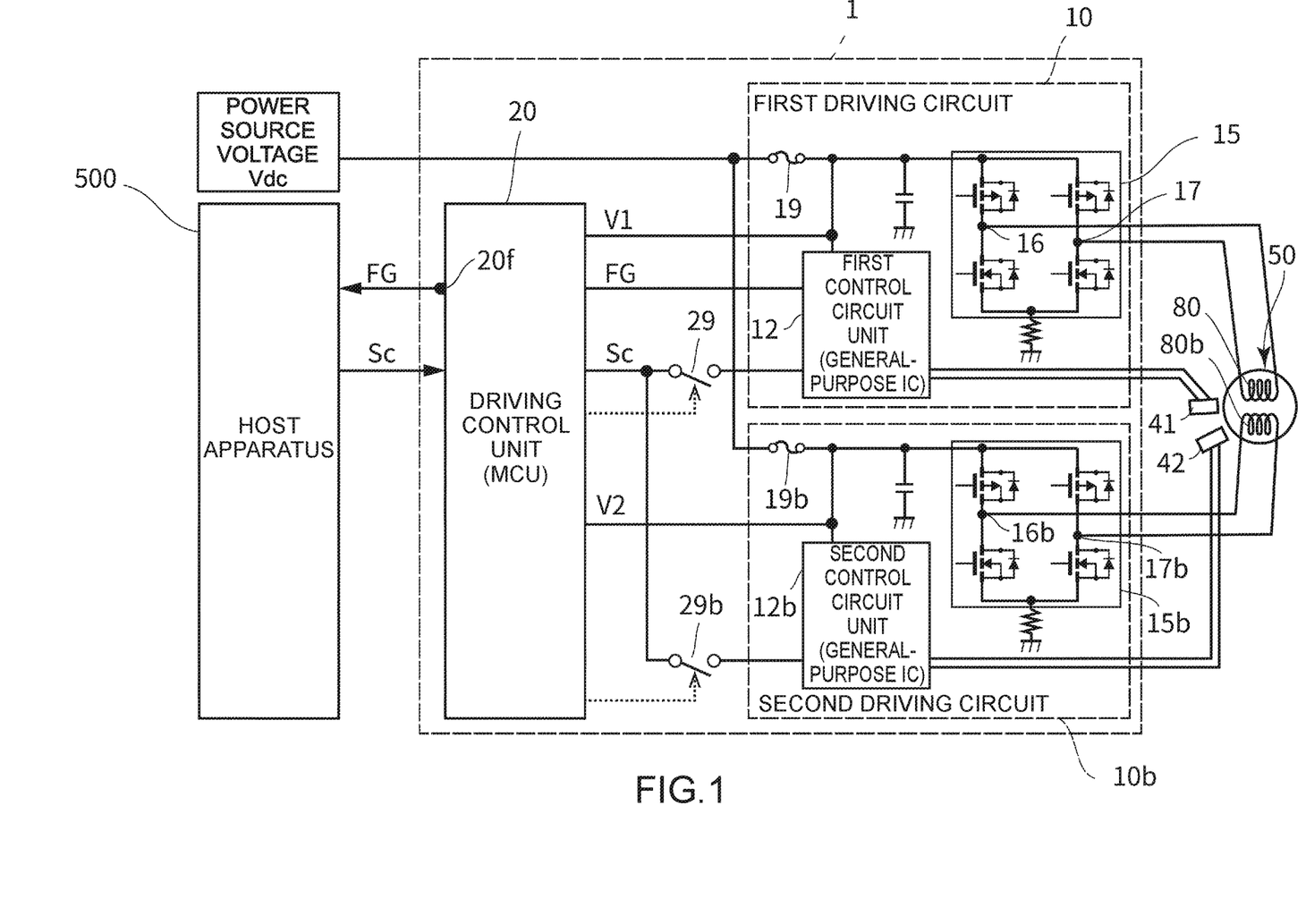
FIG. 1 is a diagram schematically showing a configuration of a motor drive control device in one of the embodiments of the present disclosure.

FIG. 1 is a diagram schematically showing a configuration of a motor drive control device 1 in one of the embodiments of the present disclosure.

As shown in FIG. 1, the motor drive control device 1 is used for a motor apparatus having a motor 50. The motor apparatus is provided with two position detectors 41 and 42 configured to output a position signal according to a rotational position of the motor 50. A DC power supply voltage Vdc is externally supplied to the motor drive control device 1.

The motor drive control device 1 is connected to a host apparatus 500. A speed command signal Sc outputted from the host apparatus 500 is inputted to the motor drive control device 1. The motor drive control device 1 causes the motor 50 to be driven according to the inputted speed command signal Sc. An FG signal corresponding to the actual number of rotations of the motor 50 is outputted to the host apparatus 500 from the motor drive control device 1. The host apparatus 500 can realize a rotation state of the motor 50 based on the FG signal outputted from the motor drive control device 1.

The motor 50 is provided with a coil 80 of a first system and a coil 80b of a second system each of which is wound around teeth (not shown). Note that each of the coil 80 of the first system and the coil 80b of the second system may be configured with one coil.

In the present embodiment, the motor drive control device 1 is provided with a first driving circuit 10, a second driving circuit 10b and a driving control unit (an example of a driving voltage detecting unit, an example of a compensation control unit and an example of a number-of-rotations detecting unit) 20 configured to control an operation of the first driving circuit 10 and an operation of the second driving circuit 10b. The first driving circuit 10 has a first control circuit unit 12 and a first inverter circuit (an example of an energizing circuit) 15 configured to energize the coil 80 of the first system based on control by the first control circuit unit 12. Further, the second driving circuit 10b has a second control circuit unit 12b and a second inverter circuit (an example of the energizing circuit) 15b configured to energize the coil 80b of the second system based on control by the second control circuit unit 12b.

The first position detector 41 is connected to the first driving circuit 10. The second position detector 42 is connected to the second driving circuit 10b. The first position detector 41 is arranged at a position corresponding to the coil 80 of the first system. The second position detector 42 is arranged at a position corresponding to the coil 80b of the second system.

The two position detectors 41 and 42 output position detection signals according to a rotor of the motor 50. The first position detector 41 outputs a position detection signal to the first control circuit unit 12 with which the first driving circuit 10 is provided. The second position detector 42 outputs a position detection signal to the second control circuit unit 12b with which the second driving circuit 10b is provided.

In the present embodiment, the first and second position detectors 41 and 42 are Hall elements. The first and second Hall elements output Hall signals which are signals having positive and negative polarities. Note that the first and second position detectors are not limited to mutually the same elements and are not limited to Hall elements.

In the present embodiment, the first driving circuit 10 and the second driving circuit 10b have mutually the same circuit configurations except that output of the FG signal is performed by the first driving circuit 10. Therefore, the configuration of the first driving circuit 10 will be described hereinafter, and the description also serves as description of the second driving circuit 10b.

The first driving circuit 10 has a fuse 19 one end of which is connected to the DC power supply voltage Vdc. In the first driving circuit 10, the DC power supply voltage Vdc is inputted to the first control circuit unit 12 and the first inverter circuit 15 via the fuse 19.

The first control circuit unit 12 is, for example, a general-purpose IC for driving of a motor. The speed command signal Sc and the position detection signal outputted from the first position detector 41 are inputted to the first control circuit unit 12. The first control circuit unit 12 outputs an output signal for causing the first inverter circuit 15 to operate, based on the position detection signal to control an operation of the first inverter circuit 15. For example, the first control circuit unit 12 detects the actual number of rotations of the motor 50 based on the position detection signal and controls an on/off operation of a switching element included in the first inverter circuit 15 so that the actual number of rotations of the motor 50 becomes the number of rotations corresponding to an inputted speed command.

The first inverter circuit 15 energizes the coil 80 of the first system that the motor 50 is provided with, based on the output signal outputted from the first control circuit unit 12. The output signal is, for example, a PWM (pulse width modulation) signal. The first inverter circuit 15 has, for example, two pairs of series circuits of two switch elements provided on both ends of the DC power supply voltage Vdc. A connection point between the switch elements of each of the pairs of two switch elements is an output terminal 16 or 17 for energizing the coil 80 of the first system. By an output signal corresponding to each switch element of the first inverter circuit 15 being outputted from the first control circuit unit 12, a switch element corresponding to each output signal performs an on/off operation, and energization of an energizing system of the coil 80 of the first system connected to the output terminals 16 and 17 is performed. The first control circuit unit 12 switches a direction of a current flowing through the coil 80 of the first system at a timing corresponding to the inputted position detection signal.

The second driving circuit 10*b* has a fuse 19*b* and output terminals 16*b* and 17*b* connected to the coil 80*b* of the second system similarly to the first driving circuit 10. The second control circuit unit 12*b* switches a direction of a current flowing through the coil 80*b* of the second system at a timing corresponding to an inputted position detection signal (a second Hall signal).

Note that, in the first driving circuit 10, the first control circuit unit 12 outputs an FG signal corresponding to the actual number of rotations of the motor 50. In this regard, in the second driving circuit 10*b*, the second control circuit unit 12*b* does not output an FG signal. Note that the FG signal may be outputted from the second control circuit unit 12*b* but not outputted from the first control circuit unit 12. Further, the FG signal may be a signal obtained by combining FG signals outputted from the first control circuit unit 12 and the second control circuit unit 12*b*, respectively.

In the present embodiment, the driving control unit 20 is, for example, a microcomputer (MCU) configured to perform a predetermined operation.

To the driving control unit 20, an FG signal corresponding to the actual number of rotations of the motor 50 outputted from the first control circuit unit 12 is inputted. The driving control unit 20 detects the actual number of rotations of the motor 50 by this FG signal, as the number-of-rotations detecting unit. Further, the driving control unit 20 has an output terminal 20*f* configured to output an FG signal. The driving control unit 20 outputs an inputted FG signal to the host apparatus 500 from the output terminal 20*f* during normal driving.

To the driving control unit 20, the speed command signal Sc inputted from the host apparatus 500 is inputted. The driving control unit 20 outputs the speed command signal Sc to the first control circuit unit 12 and the second control circuit unit 12*b*.

In the present embodiment, the speed command signal Sc is outputted to the first control circuit unit 12 and the second control circuit unit 12*b* from one output terminal of the driving control unit 20. Switch elements 29 and 29*b* are provided between the output terminal and the first control circuit unit 12 and the second control circuit unit 12*b*, respectively. The driving control unit 20 switches whether or not to switch each of the switch elements 29 and 29*b* to an on state or off state. Thereby, whether or not the speed command signal Sc is to be inputted to each of the first control circuit unit 12 and the second control circuit unit 12*b* is switched. Note that the switch elements 29 and 29*b* are, for example, transistors but are not limited to transistors.

Note that the speed command signal Sc that the driving control unit 20 outputs is, for example, a PWM (pulse width modulation) signal with a duty corresponding to a target number of rotations of the motor 50. Note that the speed command signal Sc may be a signal in other forms, for example, a signal having a frequency corresponding to the target number of rotations, or the like.

A driving voltage V1 applied to the first control circuit unit 12 is inputted to the driving control unit 20. Further, a driving voltage V2 applied to the second control circuit unit 12*b* is inputted to the driving control unit 20. That is, the driving control unit 20 detects the driving voltage V1 applied to the first driving circuit 10 and the driving voltage V2 applied to the second driving circuit 10*b* as the driving voltage detecting unit (a driving voltage detecting step).

In the present embodiment, the driving control unit 20 causes a maintenance operation for maintaining rotation (positive rotation) of the motor 50 to be executed based on a detection result of the driving voltages V1 and V2 (a detection result as the driving voltage detecting unit) and a detection result of the actual number of rotations of the motor 50 (a detection result as the number-of-rotations detecting unit), as the compensation control unit (a compensation control step). As described later, the maintenance operation is an operation of causing one driving circuit between the first driving circuit 10 and the second driving circuit 10*b* to maintain positive rotation of the motor 50 which has been performed, as far as possible in a predetermined case. When causing one driving circuit between the first driving circuit 10 and the second driving circuit 10*b* to execute the maintenance operation, the driving control unit 20 causes the operation of another driving circuit to stop.

The maintenance operation executed by the one of the first driving circuit 10 and the second driving circuit 10*b* is an operation of compensating for driving force given to the motor 50 by the other driving circuit by flowing a current that is the same as or larger than a current in a case where the maintenance operation is not performed, through the coil 80 of the first system or the coil 80*b* of the second system. In other words, the maintenance operation is a compensation operation of compensating for the driving force given to the motor 50 by the other driving circuit described above. In the present embodiment, when the maintenance operation is performed, the driving control unit 20 adjusts the duty of the speed command signal Sc to be outputted to a driving circuit to continue driving so that the actual number of rotations of the motor 50 is compensated for. Specifically, the driving control unit 20 outputs a speed command signal Sc corresponding to the number of rotations larger than the number of rotations corresponding to the speed command signal Sc inputted from the host apparatus 500 to a driving circuit to be a driving target.

As operation modes for controlling the first driving circuit 10 and the second driving circuit 10*b*, the driving control unit 20 has roughly a steady driving mode, a maintenance operation mode and a stop operation mode.

The steady driving mode is an operation mode in which the two driving circuits 10 and 10*b* are caused to operate to drive the motor 50, based on the speed command signal Sc from the host apparatus 500. Normally, control is performed in the steady driving mode.

The maintenance operation mode is an operation mode used in such a case that, between the first driving circuit 10 and the second driving circuit 10b, one is in a normal state, but the other is in an abnormal state. In the maintenance operation mode, control to cause the driving circuit in the abnormal state to be stopped and causing the driving circuit in the normal state to execute the maintenance operation is performed.

The stop operation mode is an operation mode in which both of the first driving circuit 10 and the second driving circuit 10b are caused to stop rotation of the motor 50. For example, in a case where both of the first driving circuit 10 and the second driving circuit 10b are in an abnormal state and the like, the stop operation mode is used.

The driving control unit 20 sets the operation mode in which the driving control unit 20 performs control, based on a detection result of the driving voltages V1 and V2 and a detection result of the actual number of rotations of the motor 50.

That is, for each of the first driving circuit 10 and the second driving circuit 10b, the driving control unit 20 judges whether the driving circuit is in a normal state in which continuation of rotation is possible or in an abnormal state in which continuation of rotation is difficult. Then, based on a result of the judgment, the driving control unit 20 performs control to cause the maintenance operation to be executed (the maintenance operation mode) or to cause both the first driving circuit 10 and the second driving circuit 10b to stop (stop operation mode).

In the present embodiment, if the actual number of rotations of the motor 50 is below a predetermined number of rotations, the driving control unit 20 causes the operations of both of the first driving circuit 10 and the second driving circuit 10b to stop irrespective of a detection result of the driving voltages V1 and V2 (a detection result as the driving voltage detecting unit). That is, the driving control unit 20 performs control in the stop operation mode if the actual number of rotations of the motor 50 is below the predetermined number of rotations. The predetermined number of rotations corresponds to a minimum number of rotations that enables the motor 50 in a steady state to rotate. Note that, though description will be made on the assumption that the predetermined number of rotations is 1600 rpm in the present embodiment, the predetermined number of rotations is not limited to 1600 rpm.

Further, when both of the driving voltage V1 applied to the first driving circuit 10 and the driving voltage V2 applied to the second driving circuit 10b are below a third predetermined value (for example, 10 volts), the driving control unit 20 causes the operations of both of the first driving circuit 10 and the second driving circuit 10b to stop. That is, the driving control unit 20 performs control in the stop operation mode.

When a difference between the driving voltage V1 applied to the first driving circuit 10 and the driving voltage V2 applied to the second driving circuit 10b is equal to or above a first predetermined value (for example, 1 volt), the driving control unit 20 performs the following control. The driving control unit 20 causes a driving circuit the driving voltage applied to which is higher to execute the maintenance operation. Further, the driving control unit 20 causes an operation of a driving circuit to which the driving voltage applied is lower to stop. That is, in such a case, the driving control unit 20 performs control in the maintenance operation mode. Note that, when the difference between the driving voltage V1 and the driving voltage V2 is below the first predetermined value, the driving control unit 20 does not perform the control to cause the maintenance operation to be executed (does not perform control in the maintenance operation mode).

Here, when performing control in the maintenance operation mode, the driving control unit 20 outputs a predetermined compensation time signal different from the above FG signal to the host apparatus 500 from the output terminal 20f. The compensation time signal is, for example, a signal the voltage of which is fixed at a high level. Note that the compensation time signal may be a signal fixed at a low level or a signal having a predetermined voltage waveform pattern. By the compensation time signal being inputted from the driving control unit 20, the host apparatus 500 can realize that the maintenance operation mode by the driving control unit 20 has been executed.

Further, when performing control in the stop operation mode, the driving control unit 20 outputs a predetermined stop time signal different from the above FG signal to the host apparatus 500 from the output terminal 20f. The stop time signal is, for example, a signal the voltage of which is fixed at a low level. Note that the stop time signal may be a signal fixed at a high level or a signal having a predetermined voltage waveform pattern. By the stop time signal being inputted from the driving control unit 20, the host apparatus 500 can realize that the stop operation mode by the driving control unit 20 has been executed. Note that, if it is only necessary for the host apparatus 500 to realize that either the maintenance operation mode or the stop control mode by the driving control unit 20 is being performed, the stop time signal may be the same as the compensation time signal.

Figure 2:
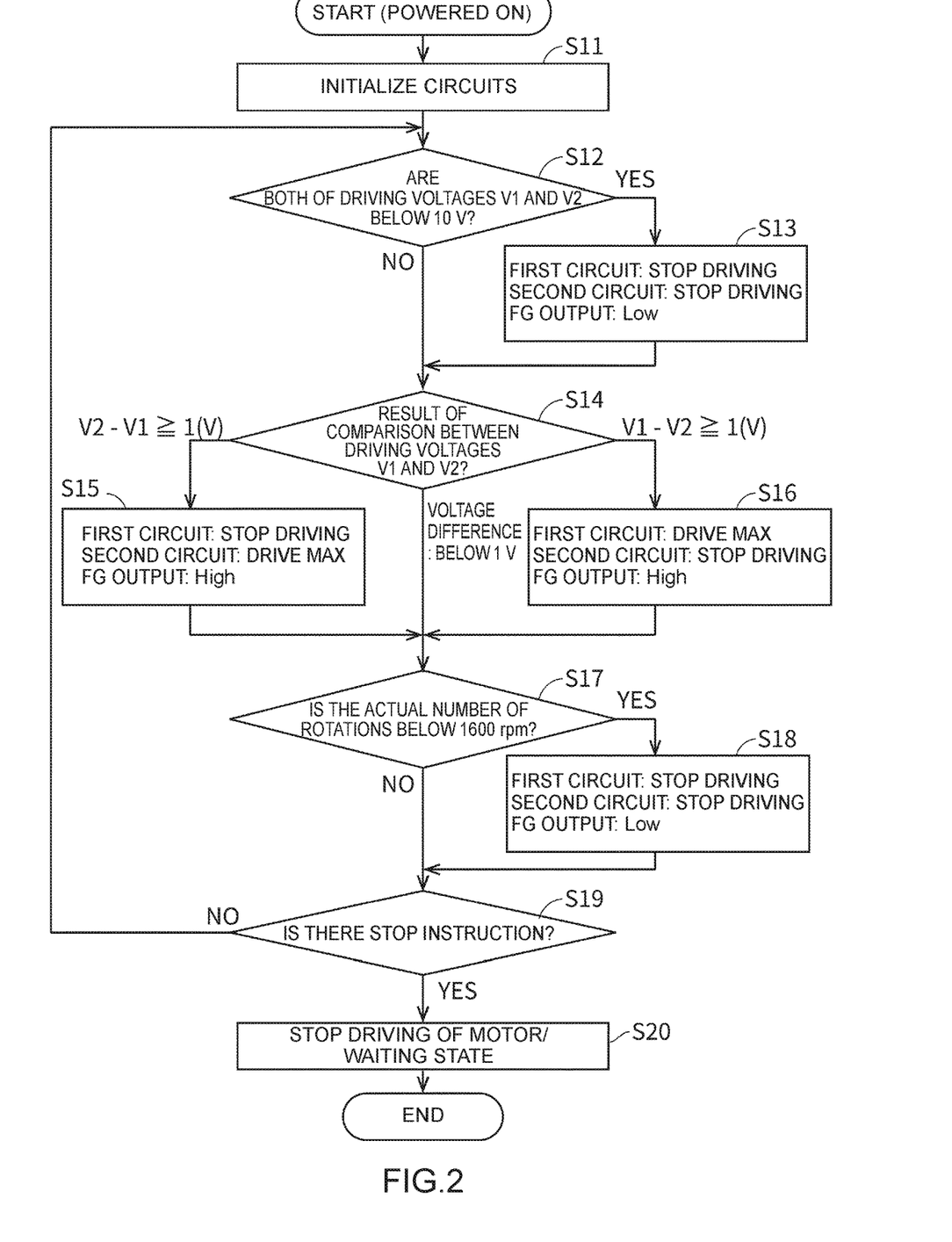
FIG. 2 is a flowchart illustrating an operation of the motor drive control device in the present embodiment.
Figure 3:
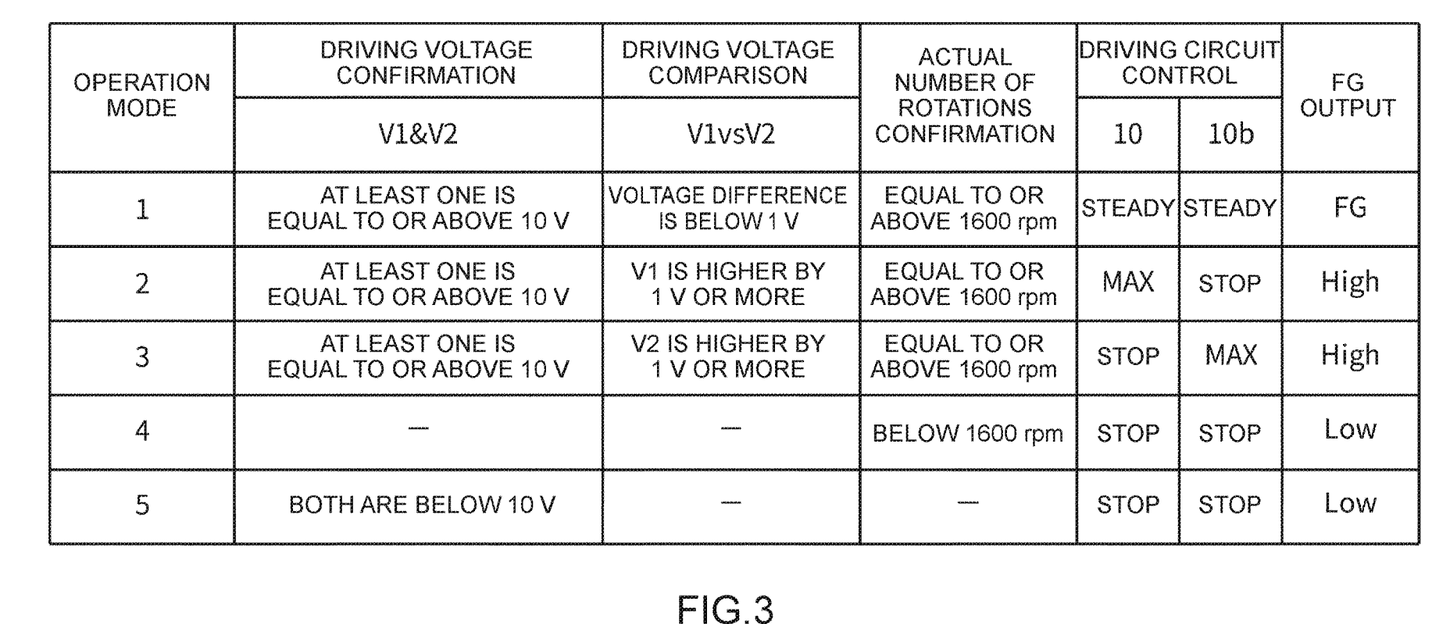
FIG. 3 is a table illustrating operation modes of a driving control unit.

FIG. 2 is a flowchart illustrating the operation of the motor drive control device 1 in the present embodiment. FIG. 3 is a table illustrating the operation modes of the driving control unit 20.

Hereinafter, a specific example of the operation of the motor drive control device 1 will be described.

As shown in FIG. 2, when the motor drive control device 1 is powered on, a process starts. At step S11, the driving control unit 20 performs an operation of initializing the circuits. After that, an operation of driving the motor 50 using the first driving circuit 10 and the second driving circuit 10b is performed according to a speed command signal Sc inputted from the host apparatus 500 (the steady driving mode). After that, the driving control unit 20 performs the following process until a stop instruction is given (step S19: YES).

That is, at step S12, the driving control unit 20 determines whether both of the driving voltages V1 and V2 are below 10 volts (an example of the third predetermined value) or not. If both of the driving voltages V1 and V2 are below 10 volts (YES), the driving control unit 20 proceeds to step S13. If not (NO), the driving control unit 20 proceeds to step S14.

At step S13, the driving control unit 20 performs control so that the following state is entered (the stop operation mode). That is, the driving control unit 20 stops the first driving circuit 10 from driving. Further, the driving control unit 20 stops the second driving circuit 10b from driving. These processes are performed, for example, by turning off both of the switch elements 29 and 29b so that the speed command signal Sc is inputted neither to the first control circuit unit 12 nor to the second control circuit unit 12b from the driving control unit 20. Further, the driving control unit 20 outputs a signal fixed at a low level (a stop time signal) from the output terminal 20f for an FG signal.

At step S14, the driving control unit 20 compares the driving voltage V1 and the driving voltage V2. The driving control unit 20 determines whether the voltage difference between the driving voltage V1 and the driving voltage V2 is equal to or above the first predetermined value (specifically, whether the driving voltage V2 is larger than the driving voltage V1 by 1 volt (an example of the first predetermined value) or more (V2−V1≥1 (V)) or the driving voltage V1 is larger than the driving voltage V2 by 1 volt (V1−V2≥1 (V))) or otherwise. If the driving voltage V2 is larger than the driving voltage V1 by 1 volt (V2−V1≥1 (V)), the driving control unit 20 proceeds to step S15. If the driving voltage V1 is larger than the driving voltage V2 by 1 volt (V1−V2≥1 (V)), the driving control unit 20 proceeds to step S16. Otherwise, (the voltage difference is below 1 volt), the driving control unit 20 proceeds to step S17.

At step S15, the driving control unit 20 performs control so that the following state is entered (the maintenance operation mode). That is, the driving control unit 20 stops the first driving circuit 10 from driving. Further, the driving control unit 20 controls the second driving circuit 10b to drive the motor 50 with maximum driving force. That is, for example, the driving control unit 20 turns off the switch element 29 and turns on the switch element 29b so that a speed command signal Sc for causing the motor 50 to be driven with a maximum number of rotations is inputted to the second control circuit unit 12b from the driving control unit 20. Further, the driving control unit 20 outputs a signal fixed at a high level (a compensation time signal) from the output terminal 20f for FG signal.

On the other hand, at step S16, the driving control unit 20 performs control so that the following state is entered (the maintenance operation mode). That is, the driving control unit 20 stops the second driving circuit 10b from driving. Further, the driving control unit 20 controls the first driving circuit 10 to drive the motor 50 with the maximum driving force. That is, for example, the driving control unit 20 turns on the switch element 29 and turns off the switch element 29b so that a speed command signal Sc for causing the motor 50 to be driven with the maximum number of rotations is inputted to the first control circuit unit 12 from the driving control unit 20. Further, the driving control unit 20 outputs a signal fixed at a high level (a compensation time signal) from the output terminal 20f for FG signal.

At step S17, the driving control unit 20 determines whether the actual number of rotations of the motor 50 is below 1600 rpm (an example of the predetermined number of rotations) or not. If the actual number of rotations of the motor 50 is below 1600 rpm (YES), the driving control unit 20 proceeds to step S18. If not (NO), the driving control unit 20 proceeds to step S19.

At step S18, the driving control unit 20 performs control so that the following state is entered (the stop operation mode). That is, the driving control unit 20 stops the first driving circuit 10 from driving. Further, the driving control unit 20 stops the second driving circuit 10b from driving. These processes are performed, for example, by turning off both of the switch elements 29 and 29b so that the speed command signal Sc is inputted neither to the first control circuit unit 12 nor to the second control circuit unit 12b from the driving control unit 20. Further, the driving control unit 20 outputs a signal fixed to a low level (a stop time signal) from the output terminal 20f for FG signal.

At step S19, the driving control unit 20 determines whether a stop instruction has been performed from the host apparatus 500 or not. If the stop instruction has not been performed (NO), the driving control unit 20 returns to step S12. If the stop instruction has been performed (YES), the driving control unit 20 proceeds to step S20.

At step S20, the driving control unit 20 performs control to cause driving of the motor 50 to be stopped. Thereby, the first driving circuit 10 and the second driving circuit 10b stop operations which cause the motor 50 to be driven. The motor drive control device 1 enters a waiting state. When the process of step S20 is performed, the series of operations ends.

Thus, the driving control unit 20 switches among the plurality of operation modes based on a detection result of the driving voltages V1 and V2 and the actual number of rotations of the motor 50. A relationship among the driving voltages V1 and V2, the actual number of rotations of the motor 50 and the operation modes is as shown in FIG. 3.

In FIG. 3, an operation mode "1" is the steady driving mode. That is, when, in a case where at least one of the driving voltages V1 and V2 is equal to or above 10 volts, the voltage difference between the driving voltage V1 and the driving voltage V2 is below 1 volt, and the actual number of rotations of the motor 50 is equal to or above 1600 rpm, the steady driving mode is entered. In the steady driving mode, both the first driving circuit 10 and the second driving circuit 10b are steadily driven based on the speed command signal Sc inputted from the host apparatus 500, and an FG signal is outputted to the host apparatus 500 from the output terminal 20f of the driving control unit 20.

In FIG. 3, an operation mode "2" is one of the maintenance operation modes. That is, when, in the case where at least one of the driving voltages V1 and V2 is equal to or above 10 volts, the driving voltage V1 is higher than the driving voltage V2 by 1 volt or more, and the actual number of rotations of the motor 50 is equal to or above 1600 rpm, the maintenance operation mode for causing the first driving circuit 10 to be driven is entered. In this maintenance operation mode, the operation of the second driving circuit 10b is stopped, and the first driving circuit 10 is driven to rotate with the maximum number of rotations irrespective of the speed command signal Sc inputted from the host apparatus 500. At this time, from the output terminal 20f of the driving control unit 20, a high-level signal is outputted to the host apparatus 500 as a compensation time signal.

In FIG. 3, an operation mode "3" is one of the maintenance operation modes. That is, when, in the case where at least one of the driving voltages V1 and V2 is equal to or above 10 volts, the driving voltage V2 is higher than the driving voltage V1 by 1 volt or more, and the actual number of rotations of the motor 50 is equal to or above 1600 rpm, the maintenance operation mode for causing the second driving circuit 10b to be driven is entered. In this maintenance operation mode, the operation of the first driving circuit 10 is stopped, and the second driving circuit 10b is driven to rotate with the maximum number of rotations irrespective of the speed command signal Sc inputted from the host apparatus 500. At this time, from the output terminal 20f of the driving control unit 20, a high-level signal is outputted to the host apparatus 500 as a compensation time signal.

In FIG. 3, an operation mode "4" is one of the stop operation modes. That is, when the actual number of rotations of the motor 50 is below 1600 rpm, the stop operation mode is always entered. In the stop operation mode, the first driving circuit 10 and the second driving circuit 10b are stopped. At this time, from the output terminal 20f of the driving control unit 20, a low-level signal is outputted to the host apparatus 500 as a stop time signal.

In FIG. 3, an operation mode "5" is one of the stop operation modes. That is, if both of the driving voltages V1 and V2 are below 10 volts, the stop operation mode is always entered. In the stop operation mode, the first driving circuit 10 and the second driving circuit 10b are stopped. At this time, from the output terminal 20f of the driving control unit 20, a low-level signal is outputted to the host apparatus 500 as a stop time signal.

As described above, in the present embodiment, even when driving stops in any one of the first driving circuit 10 and the second driving circuit 10b because the fuse 19 or 19b is blown or breaks down, it is possible to cause driving of positive rotation of the motor 50 to continue as long as possible. Therefore, for example, even if one of the driving circuits 10 and 10b stops when an external load is applied to the motor 50, it is possible to cause a rotational torque of the motor 50 to be generated, and, therefore, it is possible to continue to withstand the external load. It is possible to generate a torque stronger than a torque in the case of applying a short brake to the motor 50.

For example, even if, in the case of using a motor apparatus as one of a plurality of fan motors used for the purpose of ventilating an inside of an apparatus, one of the driving circuits 10 and 10b stops, it is possible to withstand a pressure difference between the inside and outside of the apparatus. Therefore, it is possible to prevent occurrence of trouble in which the motor 50 reversely rotates due to the pressure difference between the inside and outside of the apparatus, and its ventilation capacity deteriorates.

In the present embodiment, the driving control unit 20 can be said to be configured to, for each of the first driving circuit 10 and the second driving circuit 10b, perform an operation of judging whether the driving circuit is in a state of capable of continuing positive rotation. When judging that any of the driving circuits 10 and 10b is in an abnormal state, the driving control unit 20 switches to a state in which the motor 50 is energized only by a normal driving circuit to cause rotation of the motor 50 to be continued. At this time, the driving control unit 20 performs control so that the number of rotations becomes the maximum number of rotations (MAX) by the normal driving circuit, that is, so as to cause the duty of the speed command signal Sc, which is a PWM signal, to be 100 percent. Thereby, even if an abnormality occurs because of a reason such as the fuse 19 or 19b having been blown in one of the driving circuits, it is possible to compensate for decrease in the driving force for the motor 50 as much as possible. Therefore, it is possible to obtain the above effect more certainly.

For example, when, in a case where driving is performed in a manner that the duty becomes 80 percent in both of the first system and the second system during steady driving, an abnormality occurs in the second driving circuit 10b, driving of the motor 50 is maintained by causing the duty to be 100 percent only by the first system (the operation mode "2" in FIG. 3). Note that, when, in a case where driving is performed in a manner such that the duty becomes 100 percent in both of the first system and the second system during steady driving, an abnormality occurs in the second driving circuit 10b, and driving of positive rotation of the motor 50 is also maintained by causing the duty to be 100 percent only by the first system.

In the present embodiment, for each of the first driving circuit 10 and the second driving circuit 10b, it is determined whether an abnormality has occurred based on the voltage difference between the driving voltage V1 applied to the first driving circuit 10 and the driving voltage V2 applied to the second driving circuit 10b, and the maintenance operation is performed as necessary. Therefore, it is possible to appropriately judge occurrence of an abnormality in each of the driving circuits 10 and 10b.

Further, whether or not to perform the maintenance operation is determined based on the actual number of rotations of the motor 50 also. Therefore, the driving control unit 20 can appropriately decide whether to operate in the maintenance operation mode or to operate in the stop operation mode. That is, the driving control unit 20 performs control in the stop operation mode if the actual number of rotations of the motor 50 has not reached the predetermined number of rotations; and, therefore, for example, in a case where the actual number of rotations of the motor 50 decreases not because of an abnormality due to the driving circuits 10 and 10b but because of the rotation of the motor 50 being prevented from a foreign matter, or the like, it is possible to cause the motor 50 to stop early and cope with the abnormality. Therefore, it becomes possible to protect the driving circuits 10 and 10b of two systems.

Since a compensation time signal or a stop time signal is outputted from the output terminal 20f instead of an FG signal when control is performed in the maintenance operation mode or when control is performed in the stop operation mode, the host apparatus 500 can realize that control to cause the maintenance operation to be executed or control to cause the driving circuits 10 and 10b to stop is performed in the driving control unit 20. Since the compensation time signal or the stop time signal is outputted from the output terminal 20f configured to output an FG signal in a steady state, it is not necessary to separately provide a dedicated signal line and the like, and it is possible to simplify the configuration of the motor drive control device 1.

Note that, as the first driving circuit 10 and the second driving circuit 10b, circuits with the same circuit configurations configured to perform the same operations based on position detection signals from the two position detectors 41 and 42 can be used. Therefore, the motor drive control device 1 to energize the coils 80 and 80b of two systems can be simply configured. By energizing each of the coils 80 and 80b of two systems at an appropriate timing, it is possible to perform driving with a favorable efficiency.

Note that, in the above present embodiment, any one of the first control circuit unit 12 of the first driving circuit 10 and the second control circuit unit 12b of the second driving circuit 10b may be energized at a timing shifted from the energization timing based on an inputted position detection signal by a predetermined time (at a timing shifted by a predetermined electrical angle). In this case, a position detection signal outputted from one position detector can be shared between the driving circuits 10 and 10b, and it is possible to reduce the number of position detectors.

DESCRIPTION OF MODIFICATIONS

Hereinafter, modifications of the present embodiment will be described. In the description below, components similar to components according to the present embodiment will be given the same reference numerals or symbols, and description of the components may be omitted.

Whether or not to perform control in the maintenance operation mode or whether or not to perform control in the stop operation mode may be judged according to conditions different from the conditions described above.

For example, when a driving voltage applied to one driving circuit between the first driving circuit 10 and the second driving circuit 10b is the second predetermined value (for example, 10 volts) or above, and a driving voltage applied to another driving circuit is below the second predetermined value, the driving control unit 20 may cause the one driving circuit to execute the maintenance operation.

Figure 4:
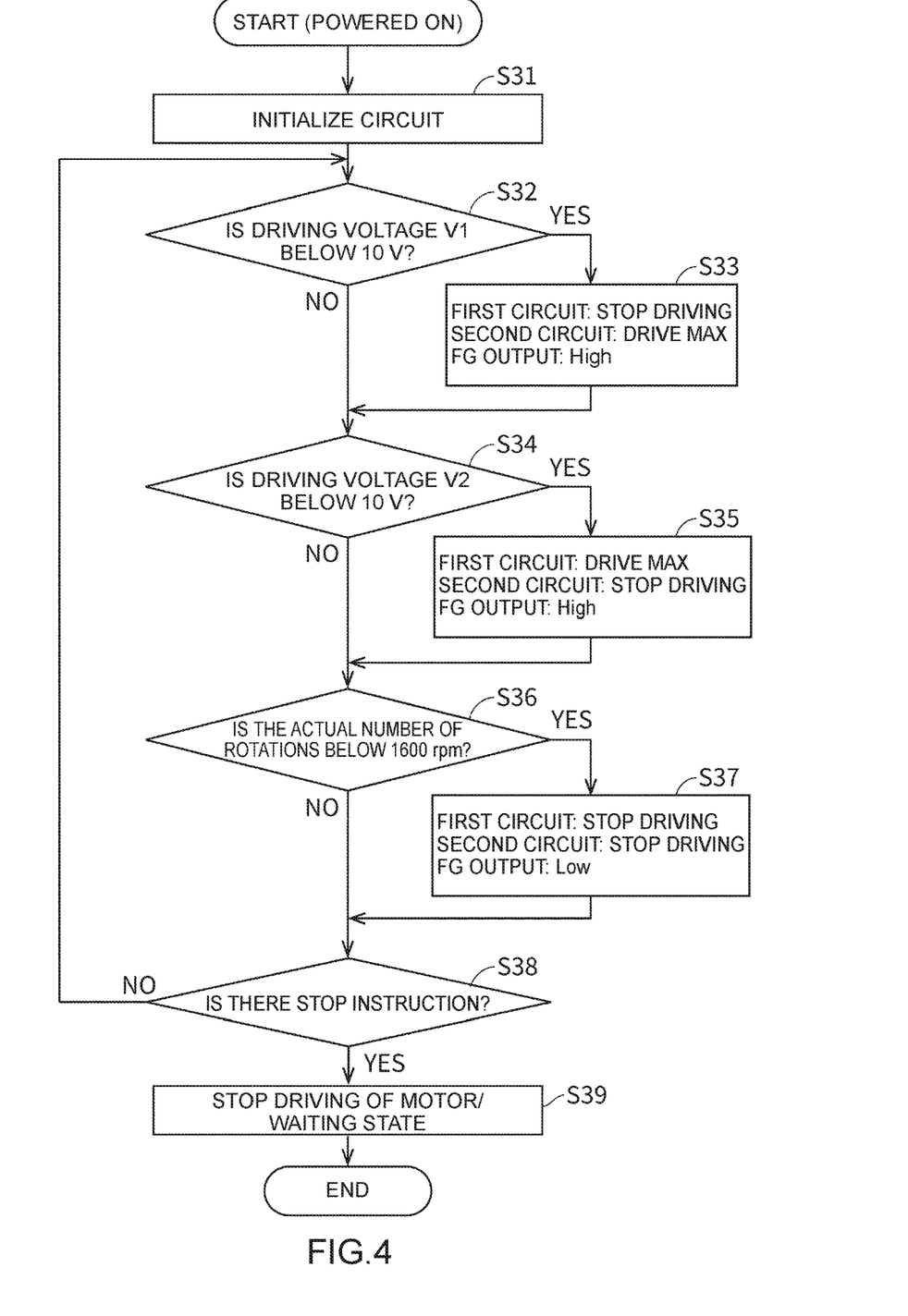
FIG. 4 is a flowchart illustrating an operation of the motor drive control device in one modification of the above embodiment.
Figure 5:
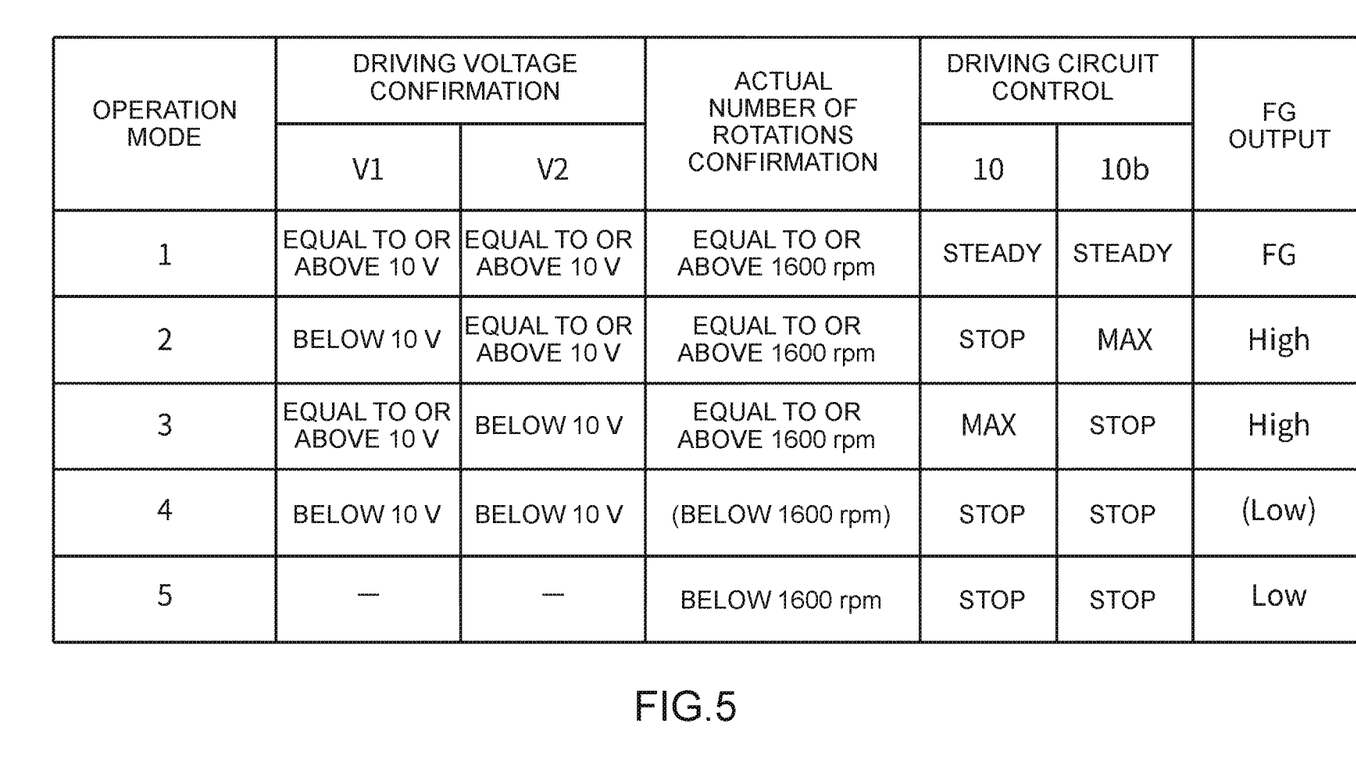
FIG. 5 is a table illustrating operation modes of the driving control unit according to the present modification.

FIG. 4 is a flowchart illustrating an operation of the motor drive control device 1 in one modification of the above embodiment. FIG. 5 is a table illustrating operation modes of the driving control unit 20 according to the present modification.

Hereinafter, a specific example of the operation of the motor drive control device 1 according to the present modification will be described.

As shown in FIG. 4, when the motor drive control device 1 is powered on, a process is started. At step S31, the driving control unit 20 performs an operation of initializing the circuits. After that, an operation of driving the motor 50 using the first driving circuit 10 and the second driving circuit 10b is performed according to a speed command signal Sc inputted from the host apparatus 500 (the steady driving mode). After that, the driving control unit 20 performs the following process until a stop instruction is performed (step S38: YES).

That is, at step S32, the driving control unit 20 determines whether the driving voltage V1 is below 10 volts (an example of the second predetermined value) or not. If the driving voltage V1 is below 10 volts (YES), the driving control unit 20 proceeds to step S33. If not (NO), the driving control unit 20 proceeds to step S34.

At step S33, the driving control unit 20 performs control so that the following state is entered (the maintenance operation mode). That is, the driving control unit 20 stops the first driving circuit 10 from driving. Further, the driving control unit 20 controls the second driving circuit 10b to drive the motor 50 with maximum driving force. That is, for example, the driving control unit 20 turns off the switch element 29 and turns on the switch element 29b so that a speed command signal Sc for causing the motor 50 to be driven with a maximum number of rotations is inputted to the second control circuit unit 12b from the driving control unit 20. Further, the driving control unit 20 outputs a signal fixed at a high level (a compensation time signal) from the output terminal 20f for FG signal.

At step S34, the driving control unit 20 determines whether the driving voltage V2 is below 10 volts or not. If the driving voltage V2 is below 10 volts (YES), the driving control unit 20 proceeds to step S35. If not (NO), the driving control unit 20 proceeds to step S36.

At step S35, the driving control unit 20 performs control so that the following state is entered (the maintenance operation mode). That is, the driving control unit 20 stops the second driving circuit 10b from driving. Further, the driving control unit 20 controls the first driving circuit 10 to drive the motor 50 with the maximum driving force. That is, for example, the driving control unit 20 turns on the switch element 29 and turns off the switch element 29b so that a speed command signal Sc for causing the motor 50 to be driven with the maximum number of rotations is inputted to the first control circuit unit 12 from the driving control unit 20. Further, the driving control unit 20 outputs a signal fixed at a high level (a compensation time signal) from the output terminal 20f for FG signal.

At step S36, the driving control unit 20 determines whether the actual number of rotations of the motor 50 is below 1600 rpm (an example of the predetermined number of rotations) or not. If the actual number of rotations of the motor 50 is below 1600 rpm (YES), the driving control unit 20 proceeds to step S37. If not (NO), the driving control unit 20 proceeds to step S38.

At step S37, the driving control unit 20 performs control so that the following state is entered (the stop operation mode). That is, the driving control unit 20 stops the first driving circuit 10 from driving. Further, the driving control unit 20 stops the second driving circuit 10b from driving. These processes are performed, for example, by turning off both of the switch elements 29 and 29b so that the speed command signal Sc is inputted neither to the first control circuit unit 12 nor to the second control circuit unit 12b from the driving control unit 20. Further, the driving control unit 20 outputs a signal fixed to a low level (a stop time signal) from the output terminal 20f for an FG signal.

At step S38, the driving control unit 20 determines whether a stop instruction has been performed from the host apparatus 500 or not. If the stop instruction has not been performed (NO), the driving control unit 20 returns to step S32. If the stop instruction has been performed (YES), the driving control unit 20 proceeds to step S39.

At step S39, the driving control unit 20 performs control to cause driving of the motor 50 to be stopped. Thereby, the first driving circuit 10 and the second driving circuit 10b stop operations of causing the motor 50 to be driven. The motor drive control device 1 enters a waiting state. When the process of step S20 is performed, the series of operations ends.

Even if such a modification is adopted, the driving control unit 20 can switch among the plurality of operation modes based on a detection result of the driving voltages V1 and V2 and the actual number of rotations of the motor 50. A relationship among the driving voltages V1 and V2, the actual number of rotations of the motor 50 and the operation modes is as shown in FIG. 5.

In FIG. 5, an operation mode "1" is the steady driving mode. That is, if all conditions of the driving voltage V1 are equal to or above 10 volts, the driving voltage V2 being equal to or above 10 volts and the actual number of rotations of the motor 50 being equal to or above 1600 rpm are satisfied, the steady driving mode is entered. In the steady driving mode, both the first driving circuit 10 and the second driving circuit 10b are steadily driven based on the speed command signal Sc inputted from the host apparatus 500, and an FG signal is outputted to the host apparatus 500 from the output terminal 20f of the driving control unit 20.

In FIG. 5, an operation mode "2" is one of the maintenance operation modes. That is, when the driving voltage V2 is equal to or above 10 volts, and the actual number of rotations of the motor 50 is equal to or above 1600 rpm, but the driving voltage V1 is below 10 volts, the maintenance operation mode for causing the second driving circuit 10b to be driven is entered. In this maintenance operation mode, the operation of the first driving circuit 10 is stopped, and the second driving circuit 10b is driven to rotate with the maximum number of rotations irrespective of the speed command signal Sc inputted from the host apparatus 500. At this time, from the output terminal 20f of the driving control unit 20, a high-level signal is outputted to the host apparatus 500 as a compensation time signal.

In FIG. 5, an operation mode "3" is one of the maintenance operation modes. That is, when the driving voltage V1 is equal to or above 10 volts, and the actual number of rotations of the motor 50 is equal to or above 1600 rpm, but the driving voltage V2 is below 10 volts, the maintenance operation mode for causing the first driving circuit 10 to be driven is entered. In this maintenance operation mode, the operation of the second driving circuit 10b is stopped, and the first driving circuit 10 is driven to rotate with the maximum number of rotations irrespective of the speed command signal Sc inputted from the host apparatus 500. At this time, from the output terminal 20f of the driving control unit 20, a high-level signal is outputted to the host apparatus 500 as a compensation time signal.

In FIG. 5, an operation mode "4" is one of the stop operation modes. That is, if both of the driving voltages V1 and V2 are below 10 volts, the stop operation mode is entered. In the stop operation mode, the first driving circuit 10 and the second driving circuit 10b are stopped. At this time, from the output terminal 20f of the driving control unit 20, a low-level signal is outputted to the host apparatus 500 as a stop time signal.

In FIG. 5, an operation mode "5" is one of the stop operation modes. That is, when the actual number of rotations of the motor 50 is below 1600 rpm, the stop operation mode is always entered. In the stop operation mode, the first driving circuit 10 and the second driving circuit 10b are stopped. At this time, from the output terminal 20f of the driving control unit 20, a low-level signal is outputted to the host apparatus 500 as a stop time signal.

In the present modification also, it is possible to obtain effects similar to the effects of the above embodiment.

Figure 6:
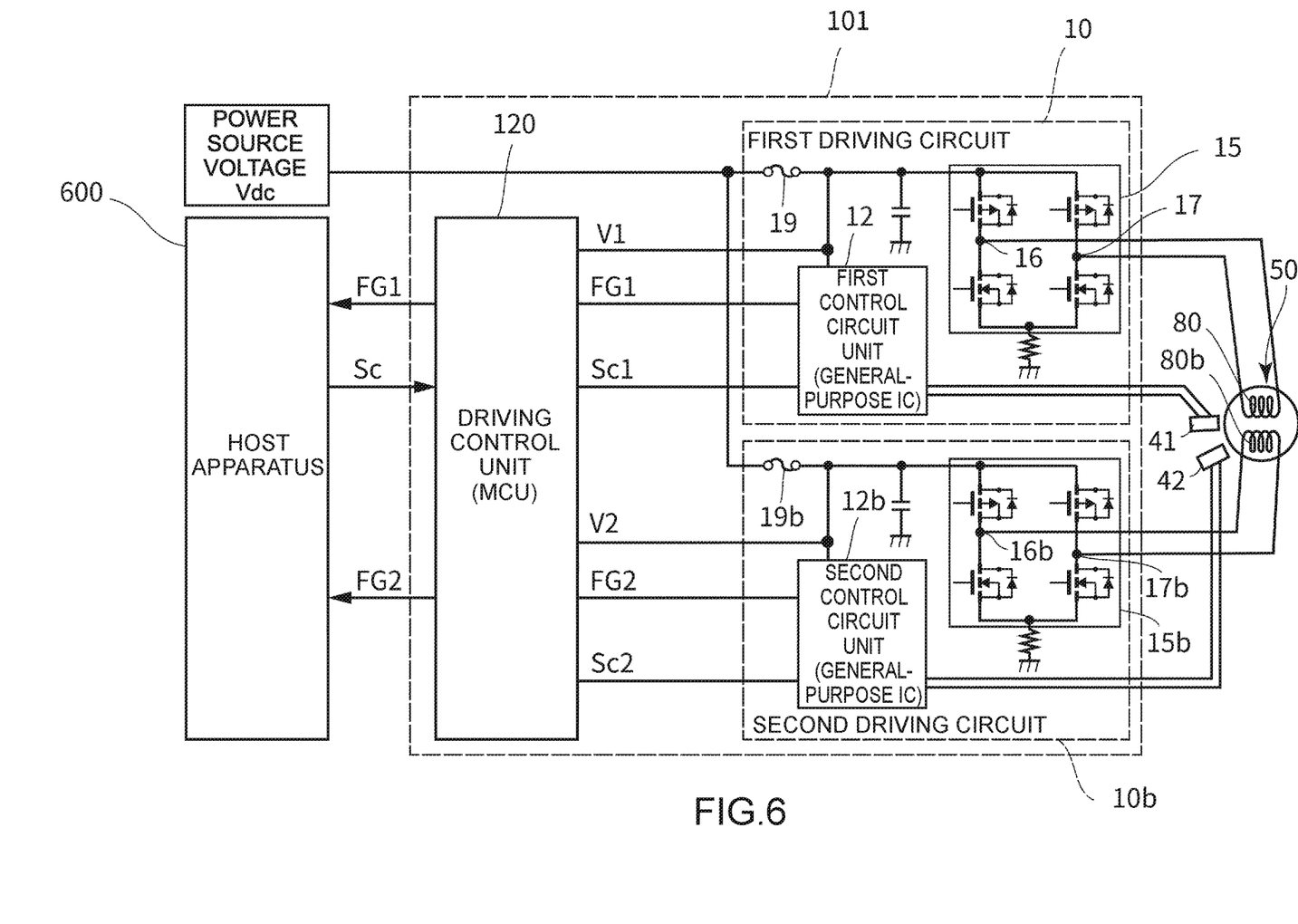
FIG. 6 is a diagram schematically showing a configuration of a motor drive control device according to another modification of the above embodiment.

FIG. 6 is a diagram schematically showing a configuration of a motor drive control device 101 according to another modification of the above embodiment.

As shown in FIG. 6, the motor drive control device 101, a part of which is different from the above description, may be used. That is, the motor drive control device 101 according to the present modification uses a driving control unit (an example of the driving voltage detecting unit, an example of the compensation control unit and an example of the number-of-rotations detecting unit) 120 different from the driving control unit 20 of the motor drive control device 1 described above in configuration. The motor drive control device 101 has driving circuits 10 and 10b similar to those in the above embodiment.

The driving control unit 120 separately outputs speed command signals Sc1 and Sc2 to the control circuit units 12 and 12b of the driving circuits 10 and 10b of two systems, respectively. Further, from the control circuit units 12 and 12b, FG signals FG1 and FG2 are inputted, respectively, to the driving control unit 120. The driving control unit 120 can output each of the inputted FG signals FG1 and FG2 to the host apparatus 500. The driving control unit 120 may output one FG signal to the host apparatus 500 based on one or both of the inputted FG signals FG1 and FG2.

In this case, duties of the speed command signals Sc1 and Sc2 can be independently set for the first control circuit unit 12 and the second control circuit unit 12b, respectively. The driving control unit 120 can drive the driving circuits 10 and 10b of two systems by PWM signals with mutually different duties in the steady driving mode. Further, in the maintenance operation mode, by outputting a speed command signal the duty of which has been increased to a driving circuit to continue driving and outputting a speed command signal the duty of which has been decreased (for example a speed command signal the duty of which is zero) to another driving circuit so that driving force by the other driving circuit is compensated for, driving of the motor 50 can be maintained.

Others

A circuit configuration of a motor drive control device is not limited to the specific examples as shown in the above embodiment and its modifications. By appropriately making a combination with individual components in the above embodiment and its modifications that have been partially modified or replacing a part of the individual components, a configuration may be made in a manner of meeting the object of the present disclosure. Further, a part of the components and functions in the above embodiment may be omitted. In addition, various circuit configurations configured in a manner of meeting the object of the present disclosure can be applied.

A motor driven by the motor drive control device of the present embodiment is not limited to the motor of the above embodiment.

The first predetermined value, the second predetermined value and the third predetermined value may be mutually different values, or any two of the predetermined values may be mutually the same values. The values shown in the above description are specific examples, and values can be appropriately set according to the specifications, use, characteristics and the like of a motor drive control device.

A control circuit unit of each driving circuit is not limited to a general-purpose IC.

The number of position detectors is not limited to two. A larger number of position detectors may be used. Detection of a rotational position of a motor is not limited to a method by a Hall sensor.

The processes shown by the flowcharts described above merely show specific examples, and processes are not limited to those described above. For example, the order of processes in each of the flowcharts described above may be appropriately exchanged, or a portion of the processes may not be performed. Further, other processes may be performed in addition to the processes shown in each of the flowcharts described above.

In the above embodiment, description has been made under the assumption that, when judging that any of driving circuits of two systems is in an abnormal state, a driving control unit switches to a state in which a motor is energized only by a normal driving circuit, as a maintenance operation mode and performs control so that the number of rotations of the normal driving circuit becomes a maximum number of rotations. The number of rotations of the normal driving circuit then is not limited to the maximum number of rotations. It is only required to perform control so that the number of rotations of the normal driving circuit becomes the number of rotations with which the maintenance operation for maintaining positive rotation of the motor can be executed.

If the actual number of rotations of the motor 50 is above the predetermined number of rotations in the present embodiment but below a target number of rotations by a predetermined value due to an abnormality other than an abnormality in the two driving circuits (for example, disconnection of a coil or the like), a compensation time signal may be outputted in order to notify the host apparatus 500 that the abnormality different from a circuit abnormality has occurred.

The above embodiment is illustrative in all the points and should be considered not to be restrictive. The scope of the present disclosure is shown not by the above description but by the claims, and it is intended that meanings equal to the claims and all changes in the claims are included.

What is claimed is:

1. A motor drive control device causing a single phase motor comprising a coil of a first system and a coil of a second system to be driven, the motor drive control device comprising:
   a first driving circuit configured to perform control to energize the coil of the first system;
   a second driving circuit configured to perform control to energize the coil of the second system; and a driving control unit configured to control an operation of the first driving circuit and an operation of the second driving circuit, wherein the driving control unit comprises:

a driving voltage detecting unit configured to detect a driving voltage applied to the first driving circuit and a driving voltage applied to the second driving circuit; and a compensation control unit configured to compare the driving voltage applied to the first driving circuit and the driving voltage applied to the second driving circuit, select one driving circuit between the first driving circuit and the second driving circuit based on the comparison result, and cause the selected driving circuit to execute a maintenance operation for maintaining rotation of the single phase motor.

2. The motor drive control device according to claim 1, wherein, when causing one driving circuit between the first driving circuit and the second driving circuit to execute the maintenance operation, the compensation control unit causes the operation of another driving circuit to stop.

3. The motor drive control device according to claim 1, wherein when a difference between the driving voltage applied to the first driving circuit and the driving voltage applied to the second driving circuit is equal to or above a first predetermined value, the compensation control unit causes a driving circuit the applied driving voltage of which is higher to execute the maintenance operation; and when the difference is below the first predetermined value, the compensation control unit does not perform control to cause the maintenance operation to be executed.

4. The motor drive control device according to claim 1, wherein, when the driving voltage applied to one driving circuit between the first driving circuit and the second driving circuit is equal to or above a second predetermined value, and the driving voltage applied to another driving circuit is below the second predetermined value, the compensation control unit causes the one driving circuit to execute the maintenance operation.

5. The motor drive control device according to claim 1, wherein, when both the driving voltage applied to the first driving circuit and the driving voltage applied to the second driving circuit are below a third predetermined value, the driving control unit causes the operations of both of the first driving circuit and the second driving circuit to stop.

6. The motor drive control device according to claim 1, wherein the driving control unit comprises an output terminal configured to output an FG signal corresponding to the actual number of rotations of the single phase motor; and when the compensation control unit performs the control to cause the maintenance operation to be executed, the driving control unit outputs a predetermined compensation time signal different from the FG signal from the output terminal.

7. The motor drive control device according to claim 6, wherein the compensation time signal is a signal with a voltage fixed at a high level or a low level.

8. The motor drive control device according to claim 1, wherein the maintenance operation executed by one driving circuit between the first driving circuit and the second driving circuit is an operation of compensating for driving force given to the single phase motor by another driving circuit by flowing a current that is the same as or larger than a current in a case where the maintenance operation is not performed, through the first coil or the second coil.

9. A motor drive control device causing a single phase motor comprising a coil of a first system and a coil of a second system to be driven, the motor drive control device comprising:

a first driving circuit configured to perform control to energize the coil of the first system;

a second driving circuit configured to perform control to energize the coil of the second system; and a driving control unit configured to control an operation of the first driving circuit and an operation of the second driving circuit, wherein the driving control unit comprises:

a driving voltage detecting unit configured to detect a driving voltage applied to the first driving circuit and a driving voltage applied to the second driving circuit; and a compensation control unit configured to cause one driving circuit between the first driving circuit and the second driving circuit to execute a maintenance operation for maintaining rotation of the single phase motor, based on a detection result of the driving voltage detecting unit, wherein the driving control unit further comprises a number-of-rotations detecting unit configured to detect an actual number of rotations of the single phase motor; and the compensation control unit causes the maintenance operation to be executed, based on a detection result of the driving voltage detecting unit and a detection result of the number-of-rotations detecting unit.

10. The motor drive control device according to claim 9, wherein, when the actual number of rotations of the single phase motor is below a predetermined number of rotations, the driving control unit causes the operations of both of the first driving circuit and the second driving circuit to stop irrespective of the detection result of the driving voltage detecting unit.

11. A control method for a motor drive control device causing a single phase motor comprising a coil of a first system and a coil of a second system to be driven, wherein the motor drive control device comprises:

a first driving circuit configured to perform control to energize the coil of the first system; and a second driving circuit configured to perform control to energize the coil of the second system; and the control method for the motor drive control device comprises:

a driving voltage detecting step of detecting a driving voltage applied to the first driving circuit and a driving voltage applied to the second driving circuit; and a compensation control step of comparing the driving voltage applied to the first driving circuit and the driving voltage applied to the second driving circuit, selecting one driving circuit between the first driving circuit and the second driving circuit based on the comparison result, and causing the selected driving circuit to execute a maintenance operation for maintaining rotation of the single phase motor.

* * * * *